(12) United States Patent
Munegowda et al.

(10) Patent No.: US 8,429,331 B2
(45) Date of Patent: Apr. 23, 2013

(54) STORAGE OPTIMIZATIONS BY DIRECTORY COMPACTION IN A FAT FILE SYSTEM

(75) Inventors: Keshava Munegowda, Bangalore (IN); Veeramanikandan Raju, Bangalore (IN); Rohit Joshi, Varanasi (IN)

(73) Assignee: Texas Instruments Incorporated, Dallas, TX (US)

( * ) Notice: Subject to any disclaimer, the term of this patent is extended or adjusted under 35 U.S.C. 154(b) by 543 days.

(21) Appl. No.: 12/326,915

(22) Filed: Dec. 3, 2008

(65) Prior Publication Data

US 2010/0138589 A1 Jun. 3, 2010

(51) Int. Cl.
*G06F 12/00* (2006.01)
*G06F 12/02* (2006.01)

(52) U.S. Cl.
USPC ............ 711/103; 711/E12.001; 711/E12.008; 707/202; 707/E12.01; 707/E12.007; 707/E12.044

(58) Field of Classification Search .................. 711/102, 711/103, E12.001, E12.008; 707/202, E17.01, 707/E17.007, E17.044
See application file for complete search history.

(56) References Cited

U.S. PATENT DOCUMENTS

| | | | |
|---|---|---|---|
| 5,890,169 A * | 3/1999 | Wong et al. | 1/1 |
| 2007/0162525 A1* | 7/2007 | Abe | 707/205 |
| 2008/0235486 A1* | 9/2008 | Sepulveda | 711/206 |
| 2008/0256139 A1* | 10/2008 | Jessee | 707/202 |

* cited by examiner

*Primary Examiner* — Yong Choe
(74) *Attorney, Agent, or Firm* — Ronald O. Neerings; Wade James Brady, III; Frederick J. Telecky, Jr.

(57) ABSTRACT

Storage optimizations by directory compaction in a file allocation table (FAT) file system. The method comprises determining if a cluster comprises a deleted content, indicating that the deleted content is deleted, and updating an entry of a FAT associated with the cluster to indicate that the cluster is free. The method may also comprise indicating that the deleted content is deleted and modifying a metadata of at least one of a file of the cluster and a directory of the cluster according to a specified protocol.

16 Claims, 9 Drawing Sheets

STORAGE OPTIMIZATIONS BY DIRECTORY COMPACTION IN A FAT FILE SYSTEM

FIELD OF TECHNOLOGY

This disclosure relates generally to data storage and more particularly to storage optimizations in a file allocation table (FAT) file system.

BACKGROUND

In a computer file system, for example a FAT file system, repeatedly creating and deleting subdirectories or files results in clusters with deleted content. As a result, many of the clusters become unavailable for user space. Consequently, free data clusters for creating new subdirectories or files may be unavailable. This unavailability may contribute to performance degradation of the computer file system.

SUMMARY

Several methods and a system for storage optimizations by directory compaction in a FAT file system are disclosed.

An exemplary embodiment provides a method for storage optimizations in a FAT file system. It is determined if a cluster comprises a deleted content. In addition, it is indicated that the deleted content is deleted. Further, an entry of a FAT associated with the cluster is updated to indicate that the cluster is free. Also, indicating that the deleted content is deleted may include changing a metadata of at least one of a file of the cluster and a cluster directory of the cluster according to a specified protocol.

An exemplary embodiment provides a system for storage optimizations in a file allocation table file system. The system includes a cluster module to determine if a cluster comprises a deleted content. The system further includes a mark module to indicate that the deleted content is deleted and a link module to update an entry of a FAT associated with the cluster in order to indicate that the cluster is free.

An exemplary embodiment provides a method for configuring a microprocessor for storage optimizations in a FAT file system. The microprocessor is configured to determine a state of cluster content. In addition, the microprocessor is configured to mark a metadata associated with the cluster content to indicate the cluster content to be in a deleted state if at least one of a file of the cluster content and a directory of the cluster content is in a deleted state. Further, the microprocessor is configured to update the FAT associated with a cluster comprising the cluster content such that the FAT indicates that the cluster is in a free state.

Other aspects and example embodiments are provided in the Drawings and the Detailed Description that follows.

BRIEF DESCRIPTION OF THE VIEWS OF DRAWINGS

Example embodiments are illustrated by way of example and not limitation in the figures of the accompanying drawings, in which like references indicate similar elements and in which.

Other features of the present embodiments will be apparent from the accompanying Drawings and from the Detailed Description that follows.

DETAILED DESCRIPTION

Several methods and a system for storage optimizations by directory compaction in a file allocation table (FAT) file system are disclosed. Although the embodiments have been described with reference to specific example embodiments, it will be evident that various modifications and changes may be made to these embodiments without departing from the broader spirit and scope of the various embodiments.

Figure 1:
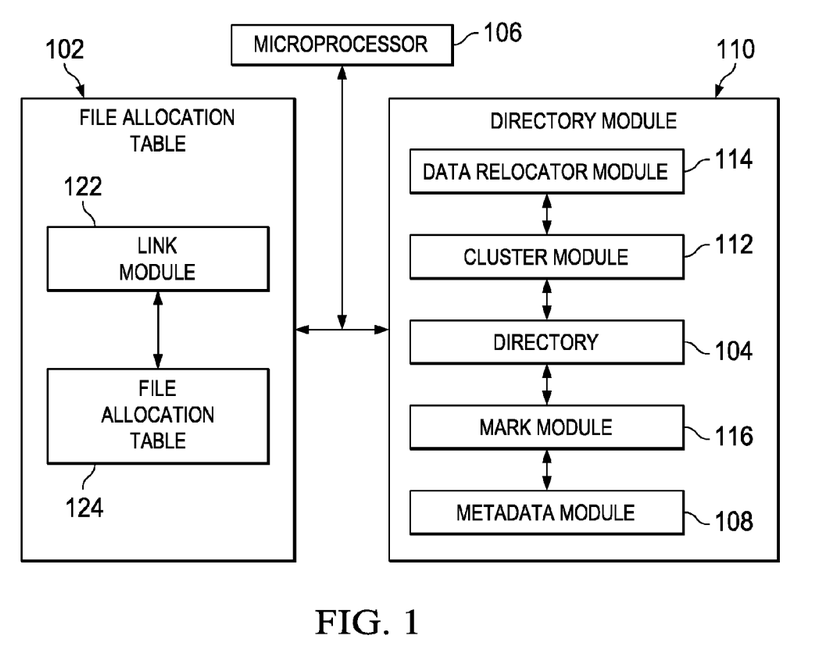
FIG. 1 is a system view of a microprocessor communicating with a FAT module and a directory module for storage optimization in a FAT file system, according to one embodiment.

FIG. 1 is a system view of a microprocessor 106 communicating with a FAT module 102 and a directory module 110 for storage optimization in a FAT file system, according to one embodiment. The microprocessor 106 may include a machine that can execute a computer program.

The FAT module 102 may include a FAT 124 and a link module 122. The FAT module 102 may be a software implemented functionality that may operate on a FAT file system architecture to perform directory compaction with the help of the microprocessor 106 and the directory module 110.

The FAT 124 may be a computer file system architecture including a list of entries that map to a set of clusters of the directory 104. The FAT 124 may include an index that allows the microprocessor 106 to traverse the storage device. The FAT 124 may be designed for use on a flash memory system of a mobile device.

The link module 122 may update an entry of the FAT 124 associated with a cluster. The link module 122 may update an entry of the FAT 124. The link module 122 may mark the entry with a zero entry 308 to indicate that the cluster is free and thus is available for user space. The zero entry 308 may be a "00". An entry update may incorporate new or accurate information. The link module 122 may update another entry of the FAT 124 associated with another cluster to point to the other cluster. The link module 122 may mark an end of clusterchain (EOC) entry in the other entry if the other cluster immediately precedes an EOC 604, 704.

The directory module 110 may include a directory 104, a metadata module 108, a cluster module 112, a mark module 116, and a data relocator module 114. The directory module 110 may be a software or a hardware implemented functionality used to organize files and subdirectories of the directory 104.

The directory 104 may be an entity in a file system which includes a group of files or cluster directories. The directory 104 may include a directory cluster, a set of clusters 202B-D, 402B-D, 602B-D followed by an end of a clusterchain 204, 404, 604, 704. A cluster may be a group of disk sectors. The cluster may include a unit of disk space allocated for data content. The data content may be a file or a cluster directory.

The cluster directory may be a subdirectory of the directory 104. The cluster may be a data block that electronically stores a set of units of memory of a flash memory system.

The directory 104 may include a clusterchain. The clusterchain may include a directory cluster. The directory cluster may be a 32-byte directory cluster 206,406 606. The 32-byte directory cluster 206,406 606 may include metadata. The metadata may include, inter alia, a file name, file attributes, time stamps, the first cluster of the file needed to start a traverse of the clusterchain and, the size of the file. Other metadata associated with the data content may be located elsewhere in the clusterchain (e.g. in a cluster directory). The 32-byte directory cluster may contain a directory entry, for example one of the directory entries 210, 310, 410, and 610. The directory entries 210, 310, 410, and 610 may point to a next cluster in a sequence of other clusters.

The metadata module 108 may manage all the information associated with the data (e.g., location of data, information of clusterchain, directory data, and cluster directory) that will be stored in the storage device. The cluster module 112 may determine if a cluster includes a deleted content. The deleted content may include a deleted file or a deleted cluster directory. The deleted content may include an entirety of the data content of the cluster, according to one embodiment. Alternatively, the deleted content may include a substantial portion of the data content of the cluster in other embodiments. The mark module 116 may indicate the deleted content as deleted according to a specified protocol. For example, the mark module 116 may mark a metadata associated with a particular file or a cluster directory with a hexadecimal value of 0xE5 to indicate that the particular file or cluster directory is deleted. The data relocator module 114 may copy an undeleted data content of the cluster to another cluster. The data relocator module 114 may delete a set of remaining data content of the cluster.

Figure 2:
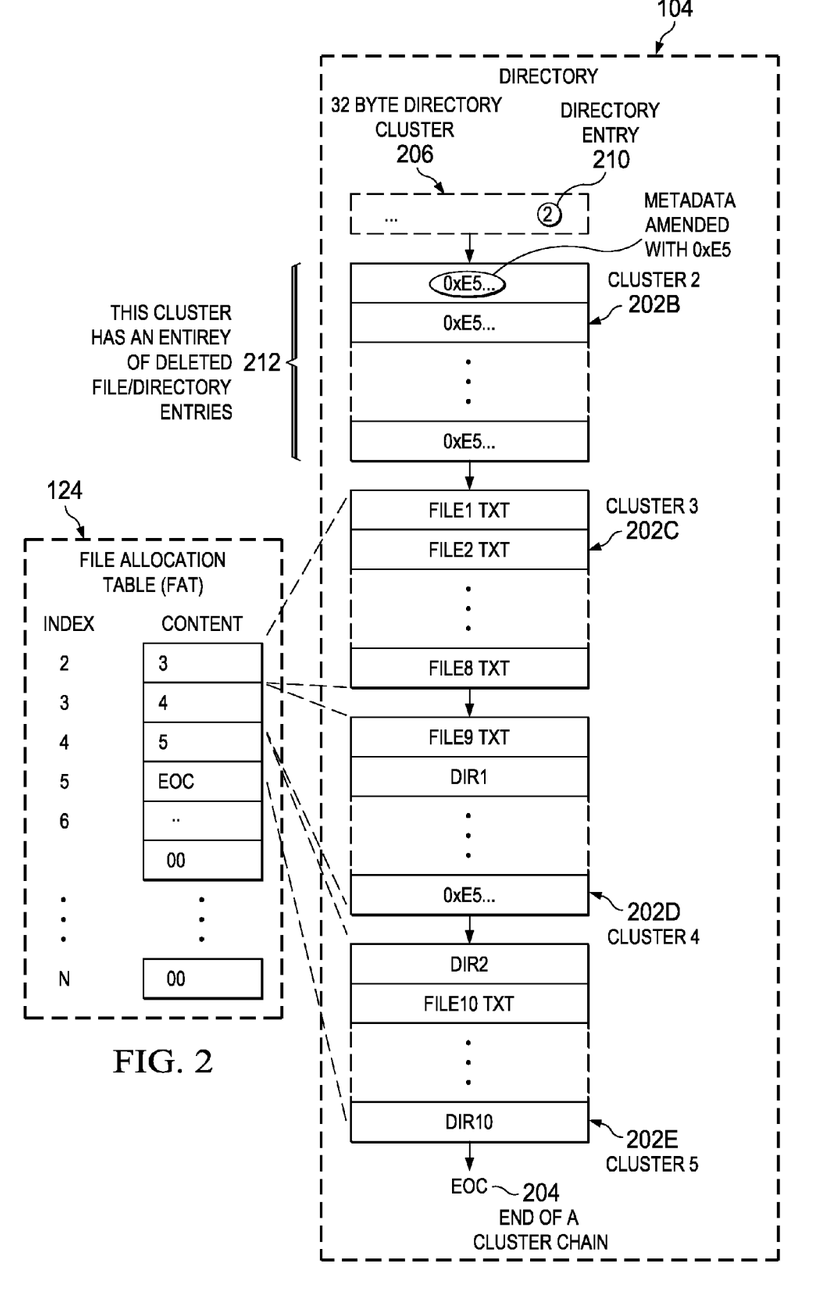
FIG. 2 is a schematic view that illustrates directory compaction according to one embodiment.

FIG. 2 is a schematic view that illustrates a process of directory compaction when the cluster including the deleted content immediately follows the 32-byte directory cluster 206. The directory 104 includes clusters namely cluster 2 202B, cluster 3 202C, cluster 4 202D and cluster 5 202E. The 32-byte directory cluster 206 may point to cluster 2 202B. The cluster module 112 may determine that cluster 2, 202B includes an entirety of deleted content 212. The mark module 116 may modify the metadata associated with an entirety of the data content to indicate that the entirety of the data content is deleted. A metadata associated with a particular file or cluster directory may be modified by the mark module 116 with a hexadecimal value of 0xE5 to indicate that the particular file or cluster directory is deleted.

Figure 3:
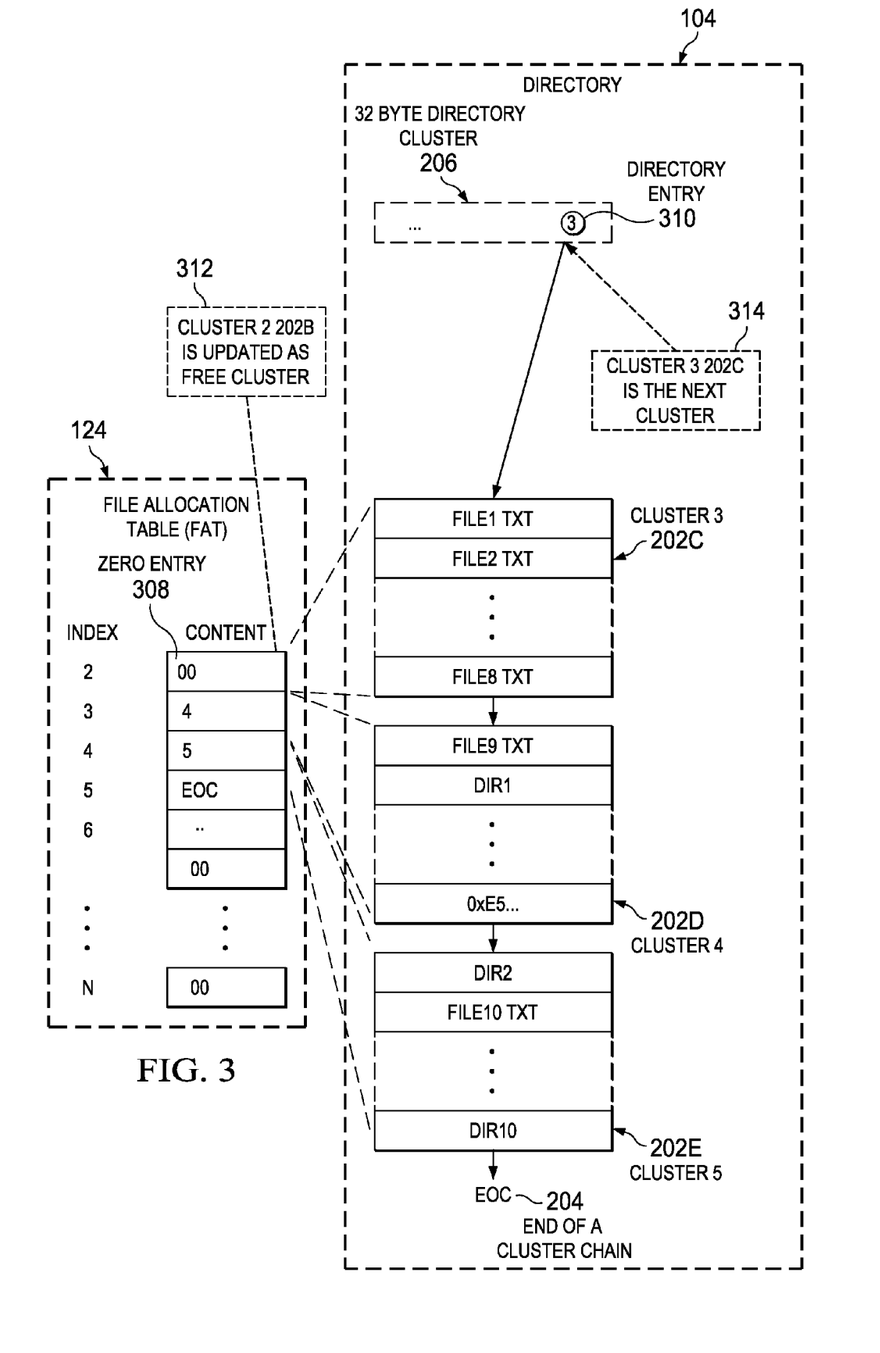
FIG. 3 is a schematic view illustrating continuation of process of directory compaction illustrated in FIG. 2.

FIG. 3 is a schematic view illustrating a continuation of the process of directory compaction illustrated in FIG. 2, according to one embodiment. The link module 122 may update an entry associated with cluster 2 202B with a zero entry 308 in order to indicate cluster 2 202B is a free cluster 312. The directory module 110 may modify the directory entry 310 of the 32-byte directory cluster to indicate that cluster 3 202C is the next cluster of the clusterchain 314. Hence, the cluster including the deleted content is free and the directory is compacted.

Figure 4:
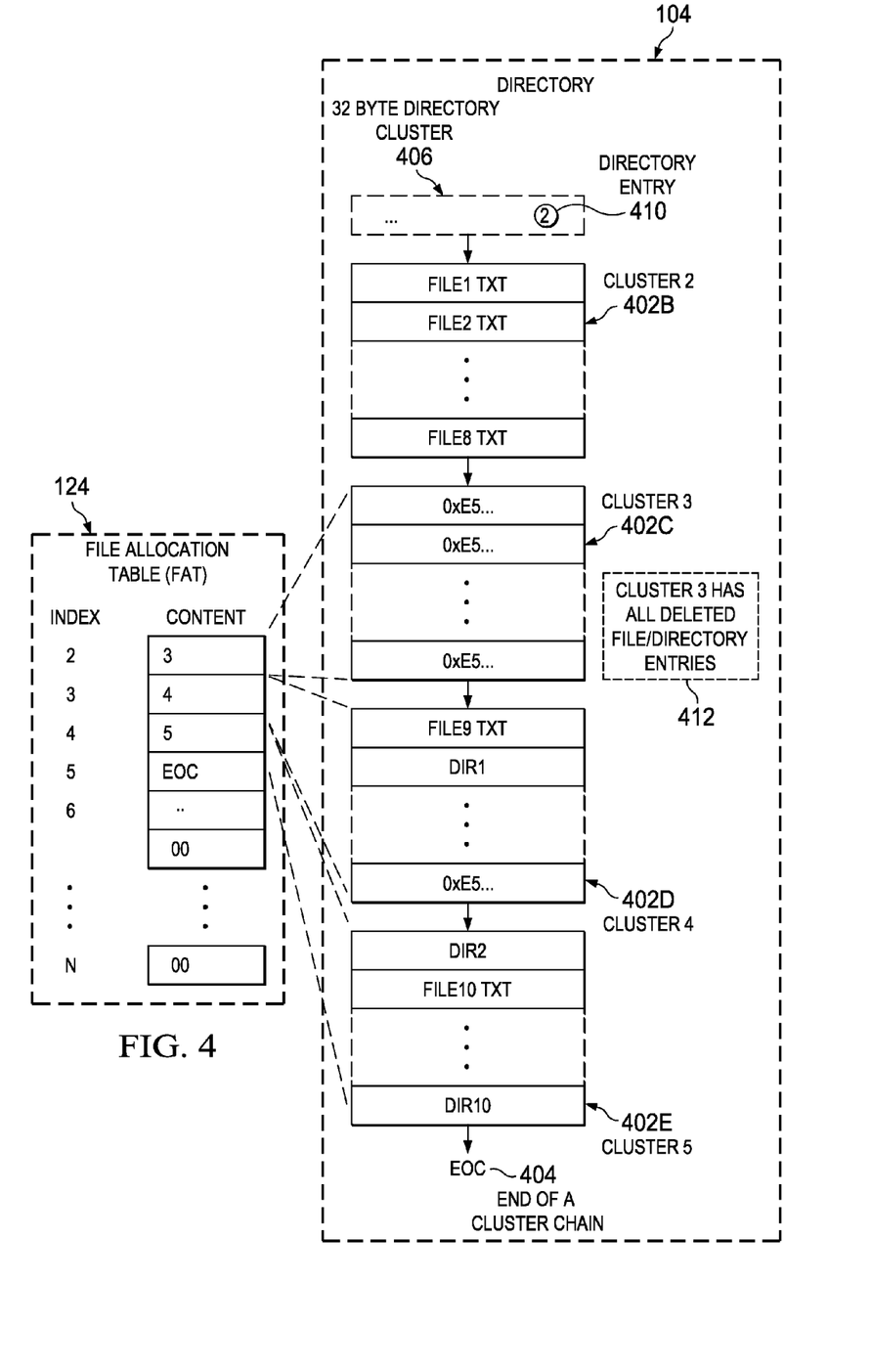
FIG. 4 is a schematic view that illustrates directory compaction according to another embodiment.

In another example embodiment, FIG. 4 illustrates another process of directory compaction when the cluster including the deleted content is in an arbitrary location of the clusterchain other than immediately following the 32-byte directory cluster 406 and immediately preceding the EOC 404. The clusterchain includes clusters 2-5 (402B, 402C, 402D and 402E). In this particular embodiment, cluster 3, 402C may represent the arbitrary cluster. Cluster 3, 402C may include an entirety of deleted content 412. The cluster module 112 may determine that cluster 3, 402C includes an entirety of deleted content. The mark module 116 may modify the metadata associated with an entirety of the data content to indicate that the entirety of the data content is deleted. A metadata associated with a particular file or cluster directory may be modified by the mark module 116 with the hexadecimal value of 0xE5 entry to indicate that the particular file or cluster directory is deleted.

Figure 5:
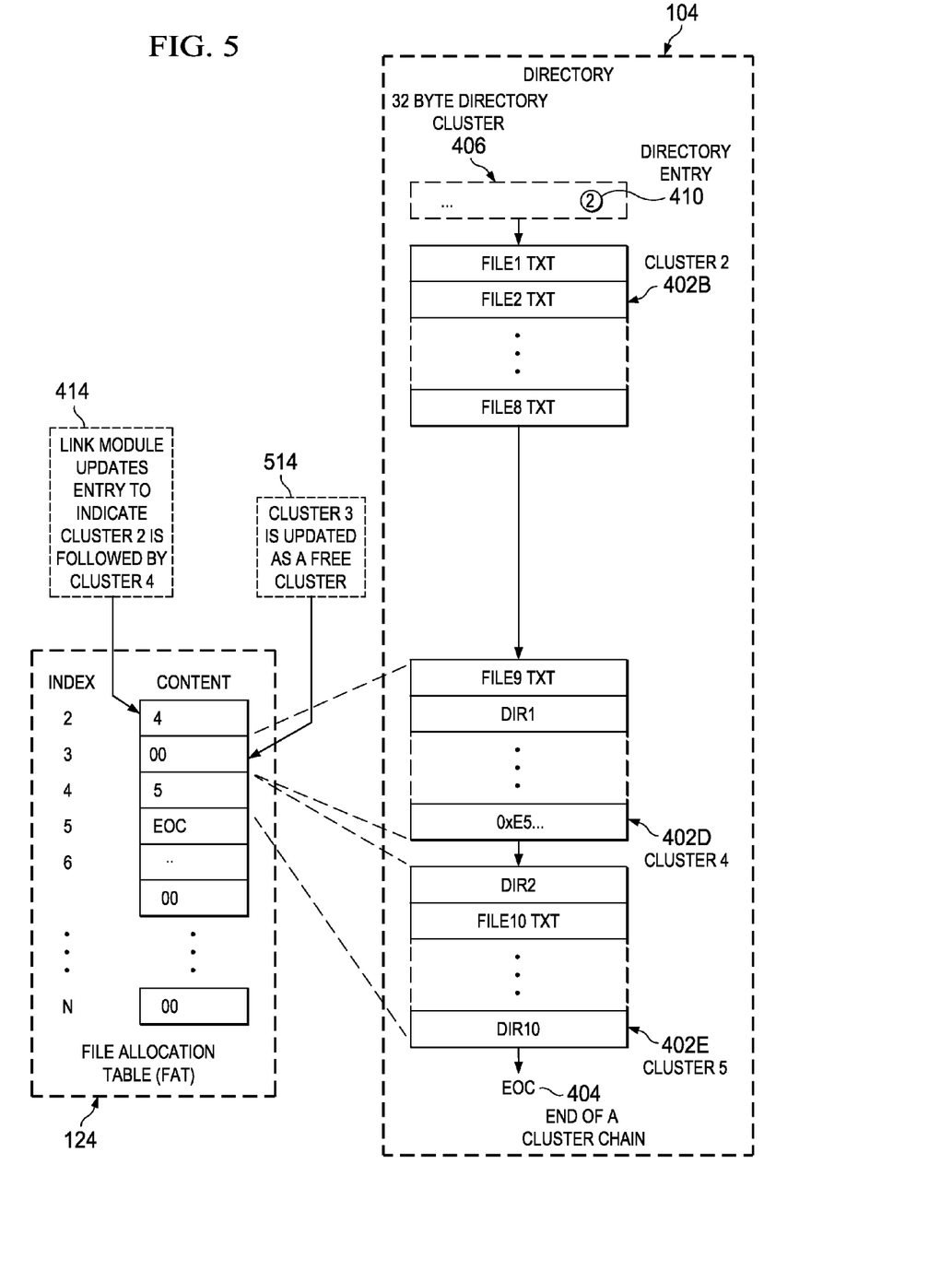
FIG. 5 is a schematic view illustrating continuation of process of directory compaction illustrated in FIG. 4.

FIG. 5 is a schematic view illustrating a continuation of the process of directory compaction illustrated in FIG. 4. The link module 414 may update an entry associated with cluster 2 402B to indicate cluster 2 402B is followed by cluster 4 402D. The link module 122 may update the entry associated with cluster 3 402C with a zero entry 308 to indicate that cluster 3 402C is a free cluster 514. Hence, the cluster including the deleted content is free and the directory is compacted.

Figure 6:
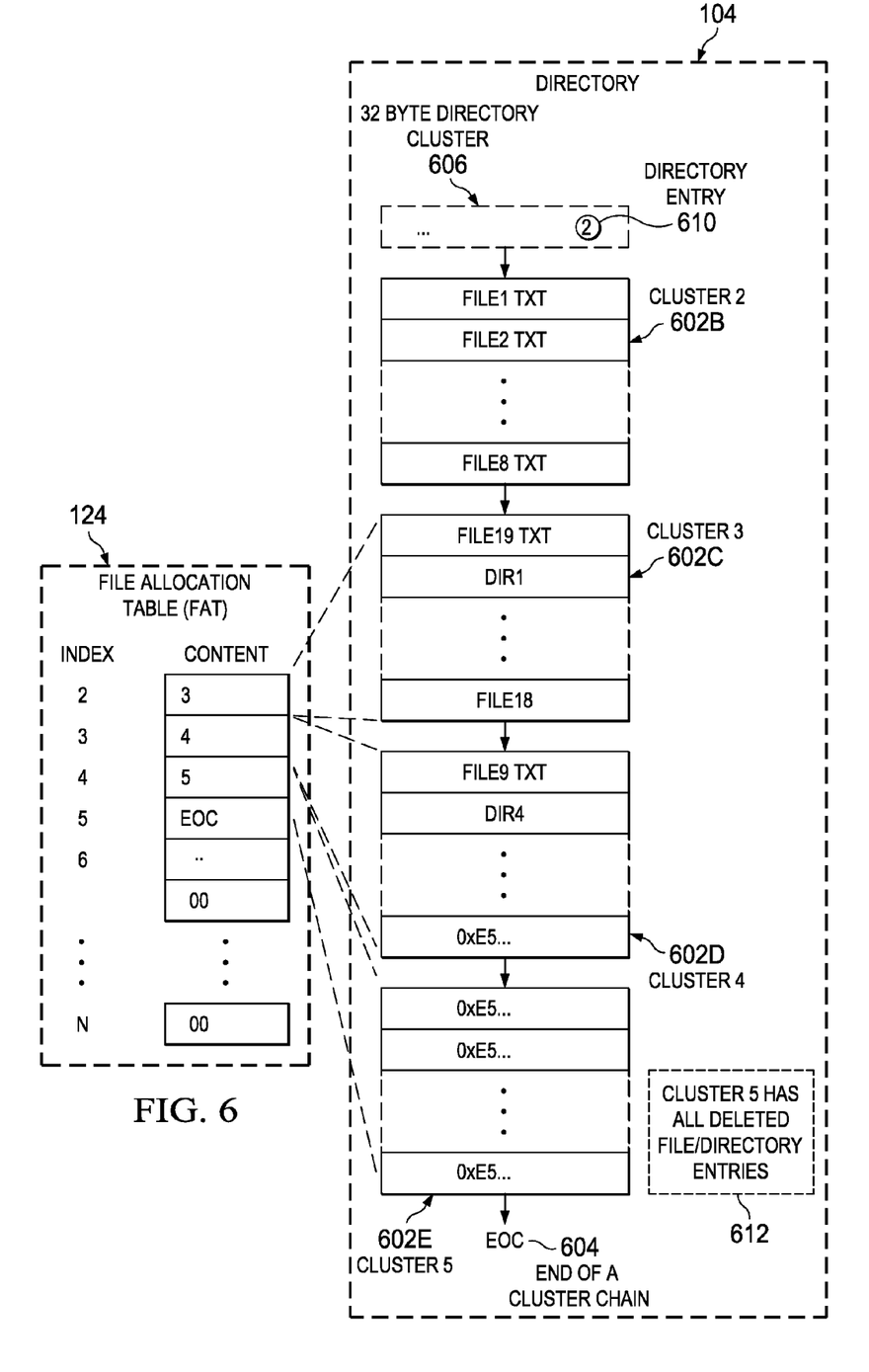
FIG. 6 is a schematic view that illustrates directory compaction according to another embodiment.

FIG. 6 is a schematic view that illustrates another process of directory compaction according to yet another embodiment. FIG. 6 illustrates a method of directory compaction when the cluster including the deleted content is immediately preceding an EOC 604 (e.g. the cluster with the deleted content is a last cluster of a clusterchain). In this particular embodiment, cluster 5 602E may represent the cluster immediately preceding the EOC 604. Cluster 5, 602E may include an entirety of deleted content 612. The cluster module 112 may determine that cluster 5, 602E includes an entirety of deleted content. The mark module 116 may modify the metadata associated with the entirety of the deleted content to indicate that the entirety of the deleted content is deleted. A metadata associated with a particular file or cluster directory may be modified by the mark module 116 with a hexadecimal value of 0xE5 to indicate that the particular file or cluster directory is deleted.

Figure 7:
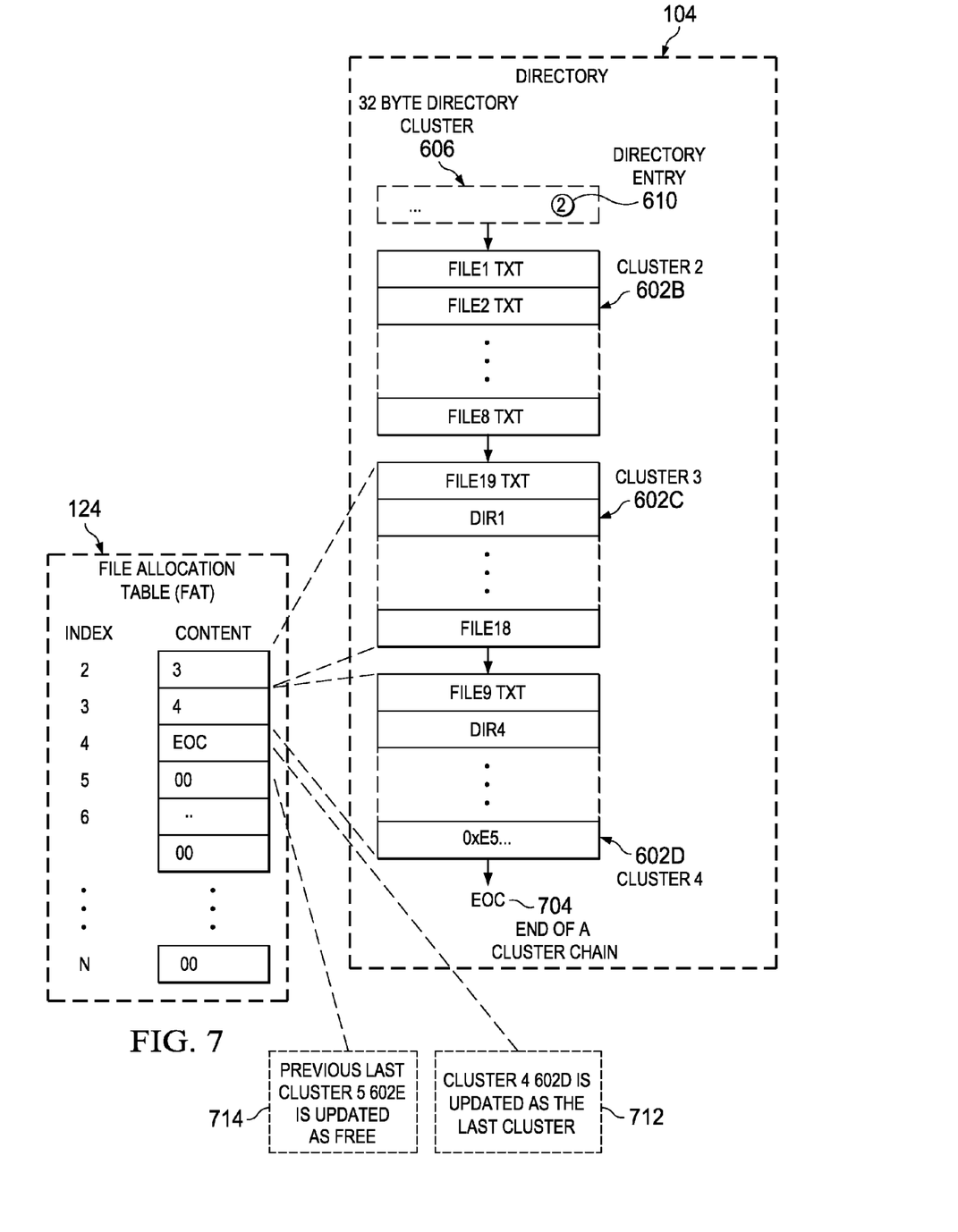
FIG. 7 is a schematic view illustrating continuation of process of directory compaction illustrated in FIG. 6.

FIG. 7 is a schematic view illustrating a continuation of the process of directory compaction illustrated in FIG. 6. The link module 122 may update an entry associated with cluster 5, 602E with the zero entry 308 in order to indicate that cluster 5, 602E is a free cluster 714. The link module 122 may update another FAT entry associated with cluster 4 602D with an EOC entry to indicate that cluster 4, 602D is a new last cluster of the clusterchain 712. Hence, the cluster including the deleted content is free and the directory is compacted.

Figure 8:
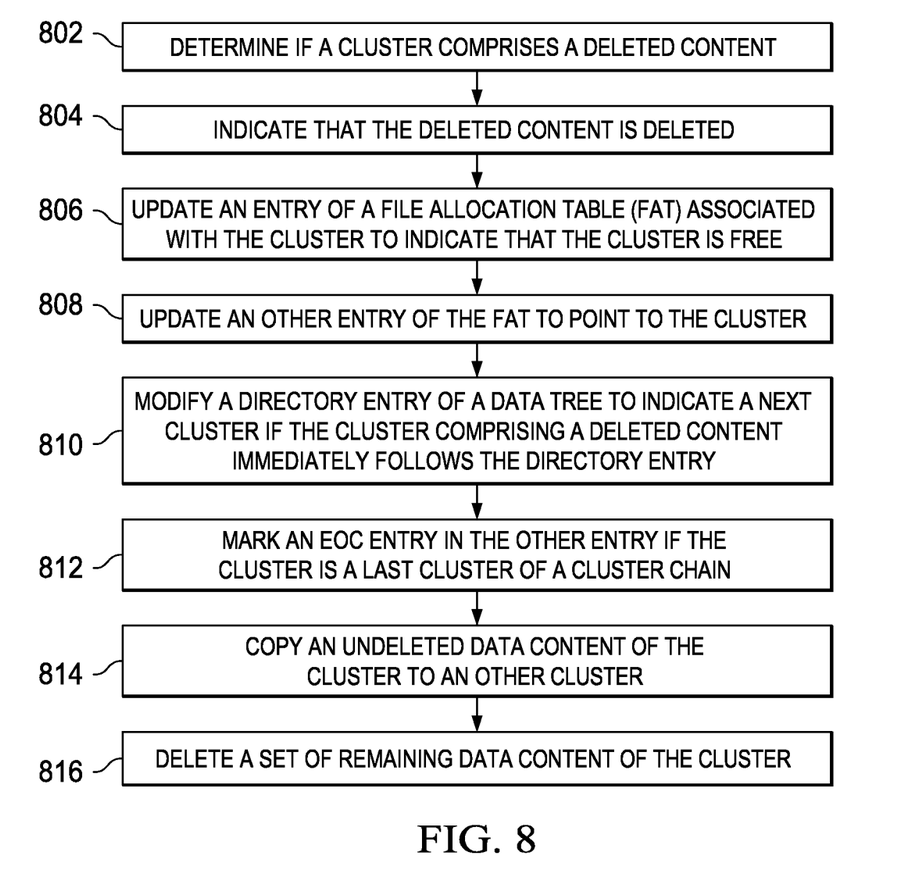
FIG. 8 is a process flow a method of directory compaction according one embodiment.

FIG. 8 is a process flow of direction compaction according to one embodiment. Operation 802 determines whether a cluster includes a deleted content. In operation 804, the deleted content may be indicated as deleted. In operation 806, an entry of the FAT 124 associated with the cluster may be updated to indicate that the cluster is free. In operation 808, another entry of the FAT 124 may be updated to point to another cluster. In operation 810, the directory entry of the 32 byte directory cluster may be modified to indicate a next cluster if the cluster comprising a deleted content immediately follows the directory entry. In operation 812, an EOC entry is marked in the other entry associated with another cluster if the cluster is a last cluster of a clusterchain. In operation 814, an undeleted data content of the cluster may be copied to another cluster. In operation 816, a set of remaining data content of the cluster may be deleted.

Figure 9:
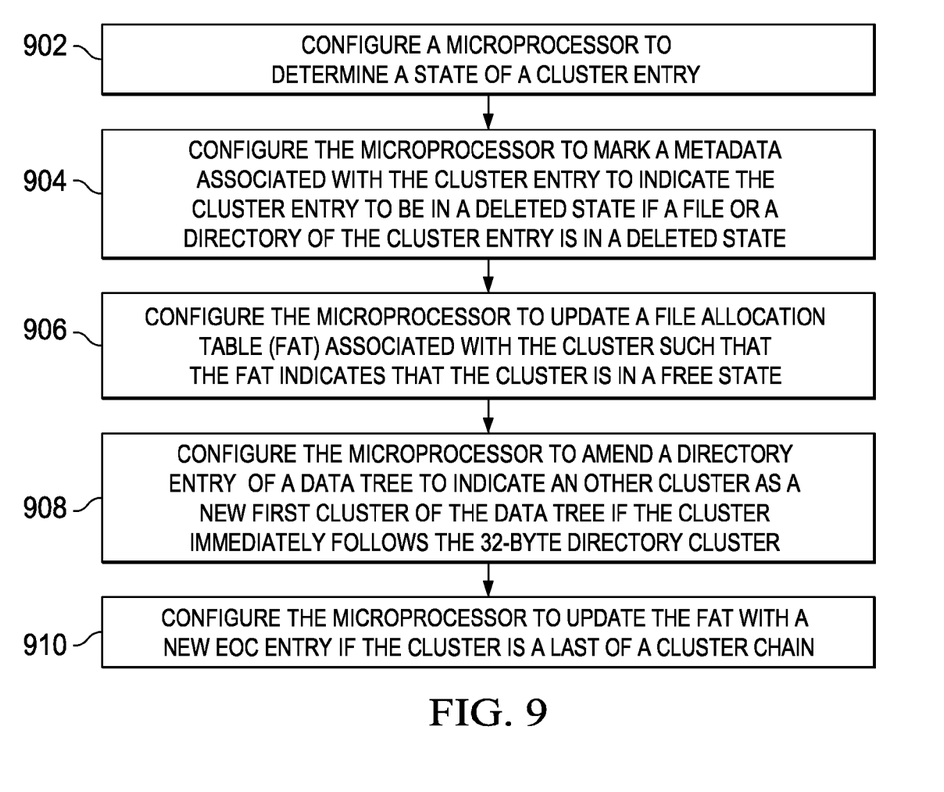
FIG. 9 is a process flow illustrating configuration of a microprocessor to compact the directory.

FIG. 9 is a process flow illustrating configuration of a microprocessor 106 to compact the directory, according to one embodiment. In operation 902, a microprocessor 106 may be configured to determine a state (e.g., deleted or not deleted) of a cluster content. In operation 904, the microprocessor 106 may be configured to mark a metadata associated with the cluster content to indicate the cluster content to be in a deleted state if a file or cluster directory of the cluster content is in a deleted state. In operation 906 the microprocessor 106 may be configured to update the FAT 124 associated with the cluster such that the FAT 124 indicates that the cluster is in a free state. In operation 908, the microprocessor 106 may be configured to modify the directory entry of a 32-byte directory cluster 206 to indicate another cluster as a new first cluster of the directory if the cluster immediately follows the 32-byte directory cluster. In operation 910, the microprocessor 106 may be configured to update the FAT 124 with a new EOC entry if the cluster is last cluster of a clusterchain.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry, firmware, software or any combination of hardware, firmware, or software (e.g., embodied in a machine readable medium). For example, the methods may be embodied using transistors, logic gates, and electrical circuits (e.g., Application Specific Integrated (ASIC) Circuitry or in Digital Signal Processor (DSP) circuitry).

Particularly, the FAT module 102, the FAT 124, the directory module 110, the microprocessor 106, the metadata module 108, the directory module 110, the cluster module 112, the data relocator module 114, the mark module 116, and the link module 122, of FIGS. 1-9, and the other modules may be enabled using software or using transistors, logic gates, and electrical circuits (e.g., application specific integrated ASIC circuitry) such as a FAT circuit, a microprocessor, a directory circuit, and other circuits.

In addition, it will be appreciated that the various operations, processes, and methods disclosed herein may be embodied in a machine-readable medium and or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method comprising:
    determining if a cluster of a directory comprises a deleted content;
    indicating that the deleted content is deleted; and
    updating an entry of a file allocation table associated with the cluster to indicate that the cluster is free;
    wherein indicating that the deleted content is deleted comprises identifying the cluster that contains entries starting with a hexadecimal value of 0xE5; and
    wherein updating the entry of the file allocation table to indicate that the cluster is free comprises marking the entry with a zero entry.

2. The method of claim 1 further comprising updating an other entry of the file allocation table to point to an other cluster of the directory.

3. The method of claim 2, wherein the cluster comprises a data block that electronically stores a set of units of memory of a flash memory system.

4. The method of claim 1 further comprising modifying a directory entry of a 32-byte directory entry cluster to indicate a next cluster if the cluster comprising the deleted content immediately follows the 32-byte directory entry cluster.

5. The method of claim 4, wherein updating the other entry of the file allocation table to point to the other cluster comprises marking an end of clusterchain entry in the other entry if the cluster is a last cluster of a clusterchain.

6. The method of claim 5:
    further comprising copying an undeleted data content of the cluster to the other cluster;
    further comprising deleting a remaining data content of the cluster; and
    wherein the file allocation table is designed for use on the flash memory system of a mobile device.

7. A non-transitory computer readable medium comprising a set of computer executable instructions adapted to perform the method of claim 1.

8. A system comprising:
    a cluster module to determine if a cluster comprises a deleted content;
    a mark module to indicate that the deleted content is deleted, wherein the mark module identifies the cluster that contains entries starting with a hexadecimal value of 0xE5; and
    a link module to update an entry of a file allocation table associated with the cluster in order to indicate that the cluster is free by marking the entry with a zero entry.

9. The system of claim 8, wherein the link module updates an other entry of the file allocation table to point to an other cluster.

10. The system of claim 9:
    wherein the cluster comprises a data block that electronically stores a set of units of memory of a flash memory system; and
    wherein the file allocation table is designed for use on the flash memory system of a mobile device.

11. The system of claim 10:
    wherein the mark module marks the metadata with a 0xE5 to indicate that the deleted content of the cluster is deleted; and
    wherein the entry of the file allocation table associated with the cluster is updated with a zero entry to indicate that the cluster is unused in order to free the cluster for a write.

12. The system of claim 11 wherein the link module marks an end of clusterchain entry in the other entry of the file allocation table if the cluster is a last cluster of a clusterchain.

13. The system of claim 12:
    wherein the mark module modifies a directory entry of a 32-byte directory entry cluster to indicate a next cluster if the cluster comprising the deleted content immediately follows the 32-byte directory entry cluster.

14. The system of claim 13 further comprising a data relocator module to copy an undeleted data content of the cluster to the other cluster and to delete a remaining data content of the cluster.

15. A method comprising:
    configuring a microprocessor to determine a state of a cluster content;
    configuring the microprocessor to mark a metadata associated with the cluster content to indicate the cluster content to be in a deleted state if at least one of a file of the cluster content and a directory of the cluster content is in a deleted state, wherein to indicate the cluster content to be in a deleted state comprises identifying the cluster that contains entries starting with a hexadecimal value of 0xE5; and
    configuring the microprocessor to update a file allocation table associated with the cluster to indicate that the cluster is in a free state, wherein to indicate that the cluster is in a free state comprises marking the entry with a zero entry.

16. The method of claim 15:
configuring the microprocessor to modify a directory entry of a 32-byte directory cluster to indicate an other cluster as a next cluster if the cluster immediately follows the 32-byte directory cluster; and
configuring the microprocessor to update the file allocation table with a new EOC entry if the cluster is a last cluster of a clusterchain.

\* \* \* \* \*